Figure 1:
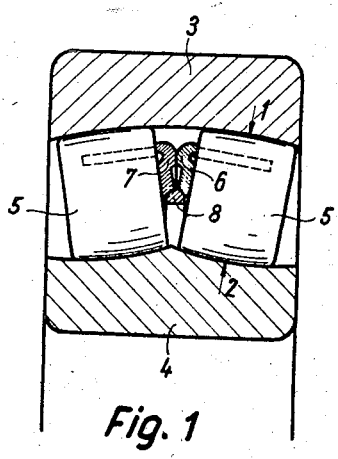

April 7, 1959

N. KÖMM 2,881,035

DOUBLE-ROW BARREL ROLLER BEARING

Filed March 23, 1953

2 Sheets-Sheet 1

Inventor
Nikolaus Kömm
by Stevens, Davis, Miller & Mosher
his attorneys

April 7, 1959     N. KÖMM     2,881,035
DOUBLE-ROW BARREL ROLLER BEARING
Filed March 23, 1953     2 Sheets-Sheet 2

United States Patent Office 2,881,035
Patented Apr. 7, 1959

2,881,035

DOUBLE-ROW BARREL ROLLER BEARING

Nikolaus Kömm, Schweinfurt, Germany, assignor to Kugelfischer Georg Schafer & Co., Schweinfurt, Germany Application March 23, 1953, Serial No. 343,942

Claims priority, application Germany April 3, 1952

3 Claims. (Cl. 308—212)

Double-row barrel roller bearings have already been known in which the two rows of rollers comprise symmetrically shaped rollers, in which the axes of the rollers in each row are oppositely inclined in relation to the main axis or center line of the bearing assembly, in which the rollers of both rows are arranged to roll on a common raceway of substantially spherical configuration provided on the inside of the outer bearing race, in which separate raceways of substantially spherical configuration for the rollers belonging to each row are provided on the outside of the inner bearing race, and in which the said rollers are maintained in spaced relationship by a cage assembly having open pockets adapted to accommodate the rollers. It has been customary engineering practice in the case of the bearings mentioned above to provide either fixed flange portions or loose ring members serving to guide the said rollers. For the above reasons it has thus far been impossible in bearings of the construction just described to reduce the width of the bearing structure without also reducing the load-carrying capacity of the bearings. Moreover, the provision of flange portions or annular guide members, due to the machining operations such portions or members involve, tends to render the manufacture of such bearings relatively uneconomical.

The present invention makes it possible to eliminate the above-mentioned deficiencies by providing double-row barrel roller bearings of the class indicated above, such bearings according to the invention being characterized in that there exists a geometrical relation between the bearing rollers and the raceways such that the rollers are exclusively guided by the bearing races. It will be seen that in two-row barrel roller bearings according to the invention the symmetrical rollers exhibit a self-guiding action: Upon being loaded, the rollers tend accurately to adjust themselves in the direction of the perpendicular forces (indicated by arrows 1, 2 in the accompanying drawing) introduced into the rollers by the outer and inner bearing race, respectively. From this it is obvious that all additional guiding means, especially in the form of fixed flanges or loose rings and the like, can be dispensed with. In a modification of the bearing according to the invention each row of rollers may be adapted to co-operate with one section of a two-section roller cage, the result being that the two rows of rollers may move separately and at different rates of speed. This latter condition is of particular advantage in cases in which the bearing assembly is subjected to axial thrust loads.

Further features and characteristics of the invention will be apparent from the following description taken in conjunction with the accompanying drawing. Figures 1 to 6 and 8 represent, by way of example, cross-sectional views of certain preferred embodiments of the invention, Figure 7 showing certain details of the embodiment of Figure 6.

In Figure 1, a two-row barrel roller bearing comprises an outer race 3, an inner race 4, a plurality of symmetrical barrel-shaped rollers 5, and the sections 6 and 7 of a two-section cage assembly. The outer race 3 is provided with a spherical raceway which is engaged by the two rows of symmetrical rollers. Provided on the inner race 4 are two separate raceways, each of these raceways being engaged by the rollers comprised in one of the two rows. Each of the two cage sections carries a plurality of fingers or projections which extend over the barrel-shaped outer surfaces of the rollers, thus defining open cage pockets each containing one bearing roller. The trunk portions of the cage sections 6 and 7 are provided with tongue-like projections which are adapted, in the manner shown in the cross-sectional drawings, to extend between the inner end faces of the rollers 5. The said cage sections 6 and 7 are positively located by an outwardly expanding annular spring member 8 which engages the trunk portions of the said cage sections.

Figure 2:
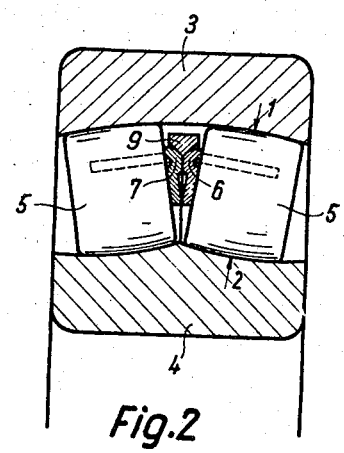
Figure 3:
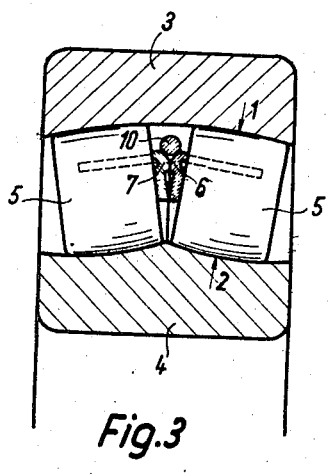
Figure 4:
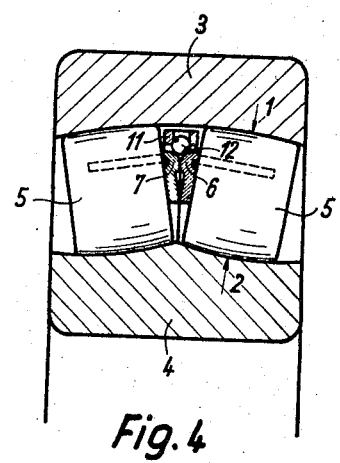
Figure 5:
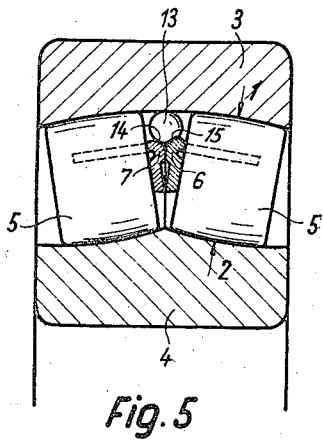
Figure 8:
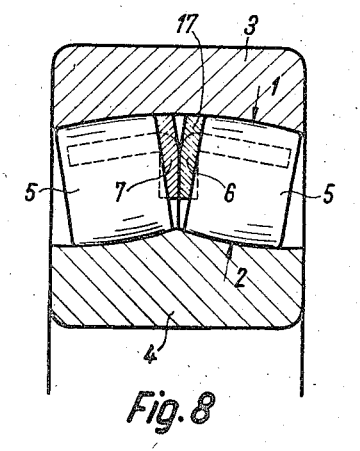

With the exception of the means employed to locate the roller cage, the general design of the embodiments shown in Figures 2 to 5 and 8 is the same as that of the embodiment of Figure 1. In the embodiment of Figure 2 the roller cage is located by an inwardly contracting annular spring member 9 which is adapted to engage the outer surfaces of the cage trunk sections 6 and 7, respectively. In the embodiment of Figure 3 the inwardly contracting annular spring member 10 is of circular cross section. In the embodiment shown in Figure 4, the resilient ball guiding ring 11 is placed over a number of balls 12 which are equidistantly spaced around the circumference of the roller cage. Figure 5 represents an embodiment in which the roller cage is positively located by a plurality of balls 13 arranged to roll on the spherical raceway of the outer race as well as on the trunk portions of the cage sections 6 and 7. Incorporated in the trunk portion of the cage section 7 is the ball raceway 14, while the trunk portion of cage section 6 is provided with part-spherical recesses 15 serving to accommodate the balls 13. In the embodiment of Figure 8, the two-piece sheet-metal cage is guided by comb-like projections 17 provided between the bearing rollers and adapted to engage the outer race 3.

Figure 6:
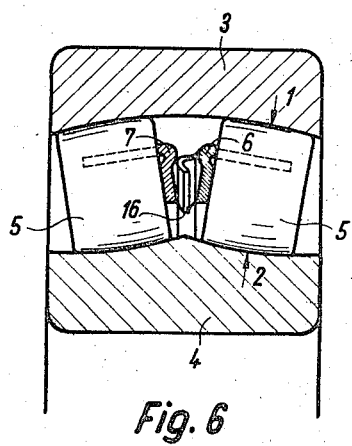
Figure 7:
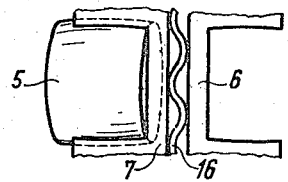

In the case of the embodiment shown in Figure 6, the roller cage is located by means of a resilient radially corrugated sheet-metal ring 16 which is interposed between the inner faces of the cage sections 6 and 7. Details of this modification, with the outer race 3 omitted, are shown in partial plan view in Figure 7.

I claim:

1. A double-row barrel roller bearing comprising an outer race ring having a concavely curved bearing surface, an inner race ring having a pair of concavely curved bearing surfaces, a first series of rolling members interposed between said rings in rolling contact with one of the bearing surfaces of said inner ring and each having a convexly curved bearing surface, a second series of rolling members interposed between said rings in rolling contact with the other bearing surface of said inner ring and each having a convexly curved bearing surface, a cage assembly located between said series of rolling members, said cage assembly comprising two sections, with each section cooperating with one of said series of rolling members, each section being formed to define an open pocket for each of said rolling members to space same, said sections including trunk portions, and means acting simultaneously on the trunk portion of both of said sections to support them in positions to resist skewing of the rolling members.

2. A bearing as defined in claim 1, wherein said trunk portions are provided with tongue-like projections extending between the inner faces of said rolling members, with the surfaces of said projections acting as the bottoms of the open pockets being embossed from the rear in a manner to produce an inclination corresponding to the operative inclination of said rolling members.

3. A bearing as defined in claim 1, wherein said trunk portions define comb-like projections which are engaged with and guided by the bearing surface on said outer race ring.

References Cited in the file of this patent

UNITED STATES PATENTS

| | | |
|---|---|---|
| 931,924 | Hess | Aug. 24, 1909 |
| 1,906,259 | Gibbons | May 2, 1933 |
| 2,430,397 | Hendricks | Nov. 4, 1947 |
| 2,489,342 | Wallgren | Nov. 29, 1949 |
| 2,611,669 | Palmgren | Sept. 23, 1952 |
| 2,642,322 | Palmgren | June 16, 1953 |